United States Patent
McAward et al.

(10) Patent No.: US 9,976,288 B2
(45) Date of Patent: May 22, 2018

(54) WIRELESS AUTOMATED SHUTOFF VALVE

(75) Inventors: James Gerard McAward, Blue Point, NY (US); David S. Zakrewski, Babylon, NY (US); Kevin G. Piel, Ronkonkoma, NY (US); Jonathan Klinger, Great Neck, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 213 days.

(21) Appl. No.: 13/435,655

(22) Filed: Mar. 30, 2012

(65) Prior Publication Data
US 2013/0255798 A1   Oct. 3, 2013

(51) Int. Cl.
| | |
|---|---|
| E03B 7/07 | (2006.01) |
| G01M 3/16 | (2006.01) |
| A47L 15/42 | (2006.01) |
| D06F 39/08 | (2006.01) |

(52) U.S. Cl.
CPC ............ *E03B 7/071* (2013.01); *A47L 15/421* (2013.01); *A47L 15/4217* (2013.01); *A47L 2501/01* (2013.01); *A47L 2501/26* (2013.01); *D06F 39/081* (2013.01); *G01M 3/16* (2013.01); *Y10T 137/5762* (2015.04); *Y10T 137/7722* (2015.04)

(58) Field of Classification Search
CPC .......... G01M 3/16; G01M 3/18; G08B 21/20; E03B 7/071; F16K 17/36; A47L 15/421; A47L 15/4212; Y10T 137/5762; F17D 5/02; F17D 5/06
USPC ....................... 251/129.04; 137/312; 340/605
See application file for complete search history.

(56) References Cited

U.S. PATENT DOCUMENTS

| | | | | |
|---|---|---|---|---|
| 3,874,403 | A * | 4/1975 | Fischer ................. | D06F 39/081 134/57 D |
| 4,380,243 | A * | 4/1983 | Braley .................. | D06F 39/081 134/113 |
| 4,845,472 | A * | 7/1989 | Gordon et al. ............... | 340/605 |
| 5,190,069 | A * | 3/1993 | Richards ....................... | 137/312 |
| 5,240,022 | A * | 8/1993 | Franklin .......................... | 137/1 |
| 5,881,755 | A * | 3/1999 | Dieringer .................. | F17D 5/06 137/1 |
| 5,966,076 | A * | 10/1999 | Cantrell ......................... | 340/605 |
| 5,992,218 | A * | 11/1999 | Tryba et al. ................ | 73/40.5 R |
| 6,003,536 | A * | 12/1999 | Polverari et al. .......... | 137/15.08 |
| 6,025,788 | A * | 2/2000 | Diduck ..................... | 340/870.16 |
| 6,057,770 | A * | 5/2000 | Justesen .................. | G01M 3/18 340/514 |
| 6,369,714 | B2 * | 4/2002 | Walter .................. | D06F 39/081 340/604 |
| 6,685,104 | B1 * | 2/2004 | Float .................... | A01G 25/167 169/16 |
| 6,810,902 | B2 * | 11/2004 | Bootka ......................... | 137/312 |
| 6,860,288 | B2 * | 3/2005 | Uhler .............................. | 137/552 |
| 7,084,776 | B2 * | 8/2006 | Tacilauskas ............ | G01M 3/16 340/604 |

(Continued)

*Primary Examiner* — Reinaldo Sanchez-Medina
*Assistant Examiner* — David Colon Morales
(74) *Attorney, Agent, or Firm* — Husch Blackwell LLP

(57) ABSTRACT

A modular water leakage detector includes a housing that carries a plurality of water leakage sensors, an electrical water shutoff valve, and circuitry coupled thereto. In response to sensing water leakage, the circuitry actuates the valve to shut off a water supply. Detectors can communicate alarm indicating signals directly with one another. The detectors can include a wireless transmitter and communicate with a displaced alarm monitoring system.

16 Claims, 2 Drawing Sheets

(56) References Cited

U.S. PATENT DOCUMENTS

| | | | |
|---|---|---|---|
| 7,114,514 B2* | 10/2006 | Houle | F24H 9/0005 137/312 |
| 7,218,237 B2* | 5/2007 | Kates | 340/605 |
| 7,403,839 B1* | 7/2008 | Kaplan | 700/282 |
| 7,549,435 B2* | 6/2009 | Walter | 137/15.11 |
| 7,900,650 B1* | 3/2011 | Wilson | 137/601.14 |
| 2001/0054965 A1* | 12/2001 | Blum et al. | 340/605 |
| 2002/0033759 A1* | 3/2002 | Morello | G01M 3/18 340/605 |
| 2006/0191323 A1* | 8/2006 | Garabedian et al. | 73/40 |
| 2006/0191324 A1* | 8/2006 | Garabedian et al. | 73/40 |
| 2007/0284293 A1* | 12/2007 | Pitchford et al. | 210/85 |
| 2007/0289635 A1* | 12/2007 | Ghazarian et al. | 137/312 |
| 2008/0230623 A1* | 9/2008 | Macnow et al. | 239/11 |
| 2008/0246621 A1* | 10/2008 | Wu | 340/605 |
| 2009/0126801 A1* | 5/2009 | Grill et al. | 137/78.3 |
| 2010/0045471 A1* | 2/2010 | Meyers | 340/605 |
| 2012/0026004 A1* | 2/2012 | Broniak et al. | 340/870.02 |

* cited by examiner

WIRELESS AUTOMATED SHUTOFF VALVE

FIELD

The application pertains to water leakage detectors. More particularly, the application pertains to such detectors that are easily connectable to flexible water hoses and can be coupled together to monitor leakage from hot and cold supplies.

BACKGROUND

Household property losses and damage arising from water leak/flood events caused by domestic water supplies can cause great economic harm. Common sources of leak/flood events include flexible hoses supplying water-using appliances, including, but not limited to washing machines, dishwashers, refrigerators, etc. Insured losses due to burst flexible water supply hoses of the type commonly used with washing machines, dishwashers, automatic icemakers, etc. are documented to exceed $100 M per year.

Automatic electromechanical methods for detecting flooding events and effecting shutoff of a domestic water supply are well known to the trade. However, installation of said methods is typically complex, expensive, and invariably requires the services of at least one and potentially more professionals, including, but not limited to licensed plumbers, licensed electricians, licensed low-voltage installation contractors, etc.

Therefore, there is a need for an effective automatic water shutoff valve that can be reliably installed by an untrained installer or a homeowner and that does not require installation by a tradesman, such as a licensed plumber, steamfitter, etc.

DETAILED DESCRIPTION

Figure 1:
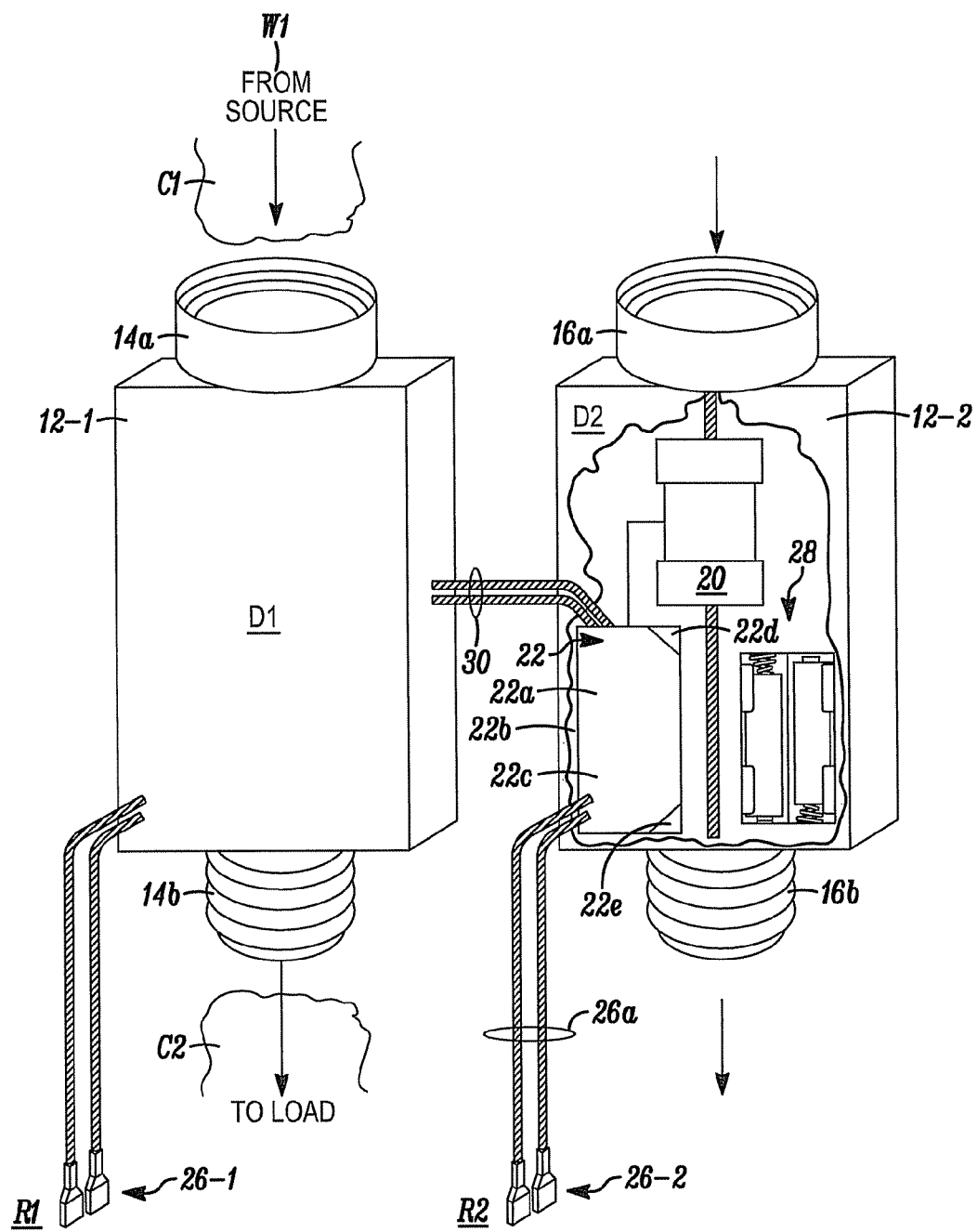
FIG. 1 is a block diagram illustrating two interconnected detectors in accordance herewith.

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

Embodiments described herein include several configurations that provide effective water leak/flood detection, effective communication of a detected problem, and effective control of the detected problem without human intervention. In addition, and advantageously, embodiments described herein are configured so as to not require the services of a licensed professional plumber or a licensed electrician to perform installation, thereby permitting more widespread and more cost effective adoption.

In one aspect, embodiments hereof detect flood conditions, shut off a malfunctioning water branch, and communicate to a premises alarm communication device or a home automation system via a wireless link. In another aspect, devices can be powered by batteries, can include circuitry to detect and communicate low-battery conditions prior to malfunction, and can include a "fail-safe" process to shut off a water branch supply prior to a battery failure.

In another aspect, water detection and shutoff units can be included in a single unit that, for example, has, at an inflow end, a spin-on female pipe connection, such as a three-quarter inch hose bib collared connector as commonly known in the North American region, or a spin-on connector specific to a product market region and/or application. At an outflow end, the units can have a spin-on male connector, such as a three-quarter inch male hose bib connector as commonly known in the North American region, or a spin-on connector specific to the product market region and/or application.

In yet another aspect, such units can also include a battery-powered shutoff valve. Representative valves include motorized ball valves or solenoid valves.

A battery-powered water presence detector can be included in the units, including, for example, commercially available detection circuitry, such as in Honeywell Model 5821. A battery powered transmitter can also be included in the units and incorporate any commonly known wireless transmission protocol, including, but not limited to any FCC Part 15 service, such as the Honeywell 5800 format or the 802.11 protocol.

In accordance herewith, a method to connect to external water-sensing devices using either wired or wireless communications can include a method to link multiple devices together, including, but not limited to applications in which valves can be used in pairs, such as with "hot" and "cold" water supply lines. Low-battery conditions and/or any of a variety of maintenance conditions can be detected and automatically reported. Further, a wireless receiver and/or associated circuitry for remote wired or wireless control of the valves can be incorporated.

FIG. 1 illustrates a pair of detectors or units D1, D2 in accordance herewith. The two units are substantially similar. The front surface of the detector D2 has been partially broken away to disclose its component parts, as discussed below.

Each of the detectors D1, D2 has an external housing 12-1, 12-2. The housing carries a pair of connectors 14a, 14b and 16a, 16b. The connectors 14a, 16a correspond to fluid inflow connectors that are coupled to a source of fluid, such as water W1. The water can be carried to a respective detector, such as D1, in an inflow conduit C1, for example, a flexible hose. The water can be carried from the detector D1 via an outflow conduit C2, such as another hose, and delivered to a load, such as an appliance or other piece of equipment which that utilizes water.

Those of skill will understand that the connectors 14a, 14b and 16a, 16b are illustrated as standard hose connectors used with flexible hose. The hoses can be easily and manually attached to the respective detector, such as D1, D2.

Each of the detectors, as best seen relative to D2, includes a motorized ball valve or a solenoid valve, without limitation, such as a valve 20. The valve is coupled between the connectors 16a, 16b and can block or permit a fluid flow through the respective detector Di.

The detectors include circuitry, generally indicated at 22, to implement the above described functionality. The circuitry 22 can include water detection circuitry 22a for flood detection, a wireless transmitter or transceiver 22b, and control logic or control circuits 22c. The circuits 22c can be implemented, at least in part, with a programmable processor 22d and executable control software 22e.

The water detection circuitry can also be connected to moisture or water detection sensors or points, generally indicated at 26. Such sensors extend from a respective housing, such as 12-2, via flexible conductors 26a. When the respective detector, such as D2, has been installed, the sensors 26 can be manually located at locations where water or moisture might be present due to a leak. Signals from the sensors 26-1, 26-2, for example, coupled to the circuitry, such as 22a, in the respective housing can indicate a presence of unwanted water or moisture in a region R1 or R2.

Indicators of the signals from the sensors 26 can be coupled from the circuitry 22a to the control circuits 22c and processed, as would be understood by those of skill in the art, to determine if the unwanted water or moisture has been sensed in the region R1. If so, then the control circuits can cause the valve 20 to change state and transition from an open condition to a closed condition, thereby halting a flow of fluid through the valve 20 and, if there is a ruptured pipe or hose, halting a flow of the water into the region R1.

The detector D2 can communicate an alarm indicating signal to the detector D1 via conductors 30. In response to the signal from the detector D2, the detector D1 can close its respective valve to further halt any inflow into the region R1.

Figure 2:
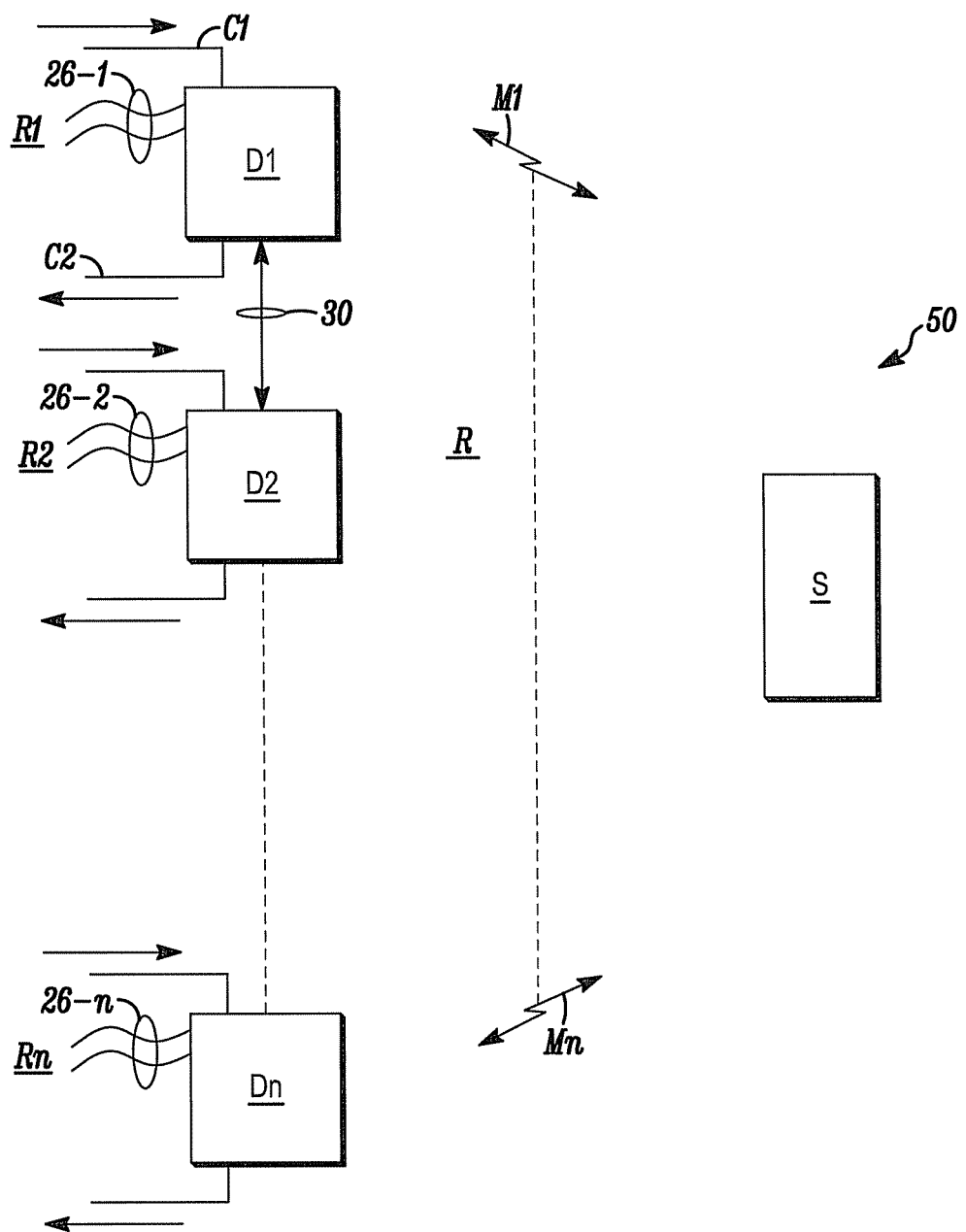
FIG. 2 is a block diagram illustrating a system that incorporates the detectors as in FIG. 1.

The detector D2 can also transmit the alarm indicating signal or a message to a displaced monitoring system S via the transmitter 22b, as best seen in FIG. 2. The units D1, D2 can be powered by batteries, indicated at 28, to provide for portable and self-contained operation. In accordance herewith, the batteries 28 could be rechargeable, if desired.

FIG. 2 illustrates a system 50 in accordance herewith. The system 50 includes a plurality of detectors, such as D1, D2 . . . Dn, all of which are substantially similar to the detectors D1, D2 previously discussed. The plurality of detectors can be installed through a region R being monitored by a regional monitoring system S.

The detectors Di can communicate directly with one another via, for example, the conductors 30 or can communicate wirelessly with the system S by sending messages Mi. As those of skill will understand, other types of detectors, such as security related (position, motion, PIR) detectors or ambient condition (gas, fire) detectors can be incorporated into the system S without limitation.

In summary, units, such as Di, as discussed above, are modular and flexible and can be used as standalone devices or may be linked to additional structures, such as hot/cold supply lines. They can be fitted with commonly-used threaded water connectors, or they can be fitted with any type of connectors commonly known to the trade.

Such units can communicate with wireless-enabled alarm detection and communication systems of a type as would be known to those of skill in the art of monitoring regions, residences, or commercial facilities. Such systems, such as the system S, can be capable of detecting and communicating detected water leaks and floods and detecting and communicating non-emergency status information (low battery, etc.) to household residents or individuals working in a monitored region.

Additionally, such systems can be programmed to actuate other wireless automated shutoff devices under specific conditions. For example, all wireless valves can be shut off throughout a protected premises based on any detected leak. Such systems can also be programmed to actuate one, some, or all of the wireless automated shutoff devices based on a remote command using any commonly available remote interactive services protocol.

Methods of installation include disconnecting a water supply hose for an appliance at a supply valve of the appliance. An inflow end of a modular unit in accordance herewith is threaded onto the supply valve. The water supply hose is threaded onto an outflow end of the modular unit. The external water sensor probes are connected to the modular unit. The external water sensing probes are placed so as to most efficiently detect potential leaks, given a local environment. If desired, pairs of such units are installed as above and optionally interconnected. In instances where a wireless monitoring system is available, the units can be enrolled or otherwise made known to the system, as would be understood by those of skill in the art.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A water detector comprising:
   a housing;
   a first flow connector carried at an inflow end of the housing;
   a second flow connector carried at an outflow end of the housing;
   a water presence sensor carried by the housing;
   an electrically actuatable valve carried by the housing and having a first state and a second state;
   control circuits carried by the housing and coupled to the water presence sensor and the electrically actuatable valve; and
   a communications port coupled to the control circuits,
   wherein, responsive to a leakage indicating signal from the water presence sensor, the control circuits actuate the electrically actuatable valve to cause the electrically actuatable valve to change from the first state to the second state, and
   wherein the communications port is directly coupled to another water detector for receiving an alarm indicating signal therefrom to actuate the electrically actuatable valve and for transmitting the leakage indicating signal thereto to actuate a local water shutoff valve of the another water detector.

2. A detector as in claim 1 wherein the electrically actuatable valve is coupled to the first and second flow connectors, and wherein the first and second flow connectors are manually coupled to flexible water hoses.

3. A detector as in claim 1 further comprising:
   a second sensor carried outside of the housing; and
   a flexible connection member coupling the second sensor to the control circuits and positioning the second sensor relative to a local environment.

4. A detector as in claim 1 further comprising:
   a self-contained power supply,
   wherein the first and second flow connectors are threadably connected to a water supply.

5. A detector as in claim 3 wherein the control circuits include a wireless transmitter to forward the leakage indicating signal to a displaced monitoring system.

6. A detector as in claim 5 further comprising:
a self-contained power supply,
wherein the first and second flow connectors are threadably connected to a water supply.

7. A water detection system comprising:
a plurality of modular water detectors,
wherein each of the plurality of modular water detectors includes a respective housing, a respective first flow connector carried at a respective inflow end of the respective housing, a respective second flow connector carried at a respective outflow end of the respective housing, a respective water presence sensor carried by the respective housing, a respective electrically actuatable valve carried by the respective housing, respective control circuits carried by the respective housing and coupled to the respective water presence sensor and the respective electrically actuatable valve, and a respective communications port coupled to the respective control circuits and directly coupled to the respective communications port of another of the plurality of modular water detectors,
wherein, responsive to a leakage indicating signal from the respective water presence sensor, the respective control circuits of a respective one of the plurality of modular water detectors actuate the respective electrically actuatable valve to cause the respective electrically actuatable valve to close, and
wherein the respective communications port of the respective one of the plurality of modular water detectors receives alarm indicating incoming signals from the another of the plurality of modular water detectors to close the respective electrically actuatable valve of the respective one of the plurality of modular water detectors and transmits the leakage indicating signal to the another of the plurality of modular water detectors to actuate the respective electrically actuatable valve of the another of the plurality of the modular water detectors.

8. A water detection system as in claim 7 wherein each of the plurality of modular water detectors includes respective external water sensors coupled to the respective control circuits, and wherein the respective control circuits of the respective one of the plurality of modular water detectors evaluate either the alarm indicating incoming signals from the another of the plurality of modular water detectors or sensor signals from the respective external sensors and, responsive thereto, transmit indicators thereof to a displaced monitoring system.

9. A water leakage detector comprising:
a housing;
a water detection and shut-off element carried by the housing;
alarm monitoring circuitry carried by the housing and coupled to the water detection and shut-off element;
a first manually engageable water flow connector coupled to the water detection and shut-off element at an inflow end;
a second manually engageable water flow connector coupled to the water detector and shut-off element at an outflow end; and
a first communications port coupled to the alarm monitoring circuitry,
wherein, responsive to a first signal, the alarm monitoring circuitry actuates the water detection and shut-off element to cause the water detection and shut-off element to change state, and
wherein the first communications port is directly coupled to another water leakage detector for receiving a second signal therefrom to actuate the water detection and shut-off element and for transmitting the first signal thereto to actuate a local water shutoff valve of the another water leakage detector.

10. A water leakage detector as in claim 9 further comprising a water presence sensor coupled to the water detection and shut-off element.

11. A water leakage detector as in claim 9 wherein the first and second manually engageable water flow connectors include one of threaded or quick release couplers connected to the water detection and shut-off element.

12. A water leakage detector as in claim 11 wherein the water detection and shut-off element includes an automatically actuatable valve.

13. A water leakage detector as in claim 10 wherein the alarm monitoring circuitry receives the first signal from the water presence sensor.

14. A water leakage detector as in claim 13 further comprising a wireless transmitter to communicate alarm indicating signals to a displaced monitoring system.

15. A water leakage detector as in claim 9 further comprising:
interconnect wires that couple the first communications port to a displaced second port of the another water leakage detector,
wherein the first and second manually engageable water flow connectors include threadably connectable hose connectors.

16. A water leakage detector as in claim 9 further comprising a wireless transceiver for communications with a displaced monitoring system.

* * * * *